United States Patent
Yang et al.

(10) Patent No.: US 10,496,333 B2
(45) Date of Patent: Dec. 3, 2019

(54) SYSTEM AND METHOD FOR END TO END QOS SOLUTION FOR DATA STORAGE SYSTEMS

(71) Applicant: EMC IP Holding Company, LLC, Hopkinton, MA (US)

(72) Inventors: Lifeng Yang, Beijing (CN); Xinlei Xu, Beijing (CN); Changyu Feng, Beijing (CN); Liam Xiongcheng Li, Beijing (CN); Ruiyong Jia, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 38 days.

(21) Appl. No.: 15/883,287

(22) Filed: Jan. 30, 2018

(65) Prior Publication Data
US 2019/0129653 A1    May 2, 2019

(30) Foreign Application Priority Data
Oct. 27, 2017  (CN) .......................... 2017 1 1026814

(51) Int. Cl.
*G06F 3/06* (2006.01)
*H04L 29/08* (2006.01)

(52) U.S. Cl.
CPC ............ *G06F 3/0659* (2013.01); *G06F 3/061* (2013.01); *G06F 3/0604* (2013.01); *G06F 3/067* (2013.01); *G06F 3/0689* (2013.01); *H04L 67/1097* (2013.01)

(58) Field of Classification Search
CPC ...... G06F 3/0659; G06F 3/0604; G06F 3/061; G06F 3/067; G06F 3/0689

USPC ............................................................ 710/6
See application file for complete search history.

(56) References Cited

U.S. PATENT DOCUMENTS

| | | | | |
|---|---|---|---|---|
| 6,813,767 B1 * | 11/2004 | Willke | ..................... | G06F 13/36 710/107 |
| 6,839,740 B1 * | 1/2005 | Kiselev | ................. | G06F 3/0607 709/214 |
| 6,862,265 B1 * | 3/2005 | Appala | ................. | H04L 47/527 370/235 |
| 6,925,055 B1 * | 8/2005 | Erimli | ..................... | H04L 47/10 370/229 |
| 8,250,257 B1 * | 8/2012 | Harel | ...................... | G06F 3/061 710/38 |
| 8,855,189 B1 * | 10/2014 | Krause | ........... | H04N 21/234309 375/240 |
| 2004/0133707 A1 * | 7/2004 | Yoshiya | ................ | G06F 3/0611 710/6 |
| 2005/0080940 A1 * | 4/2005 | Flynn, Jr. | .............. | G06F 3/0607 710/15 |

(Continued)

*Primary Examiner* — Paul R. Myers
(74) *Attorney, Agent, or Firm* — Brian J. Colandreo; Mark H. Whittenberger; Holland & Knight LLP

(57) ABSTRACT

A method, computer program product, and computer system for receiving, by a computing device, an I/O request, wherein the I/O request may include host I/O priority information. It may be determined that the I/O request is associated with a token bucket of a plurality of token buckets based upon, at least in part, the host I/O priority information. If the token bucket of the plurality of token buckets has sufficient tokens for the I/O request, the I/O request may be sent down a block stack for processing, and if the token bucket of the plurality of token buckets has insufficient tokens for the I/O request, the I/O request may be rejected.

12 Claims, 9 Drawing Sheets

(56) References Cited

U.S. PATENT DOCUMENTS

| | | | |
|---|---|---|---|
| 2007/0104208 A1* | 5/2007 | Svensson | H04L 12/1859 370/412 |
| 2007/0118706 A1* | 5/2007 | Pepper | G06F 3/0605 711/163 |
| 2007/0153682 A1* | 7/2007 | Swenson | H04L 47/10 370/229 |
| 2010/0085874 A1* | 4/2010 | Noy | H04L 47/10 370/230 |
| 2010/0332696 A1* | 12/2010 | Muppirala | G06F 13/1642 710/39 |
| 2011/0083175 A1* | 4/2011 | Bharrat | H04L 47/20 726/13 |
| 2013/0073820 A1* | 3/2013 | Watanabe | G06F 3/0611 711/162 |

* cited by examiner

SYSTEM AND METHOD FOR END TO END QOS SOLUTION FOR DATA STORAGE SYSTEMS

RELATED APPLICATION

The subject application claims the priority of China Patent Application No. 201711026814.2, filed on 27 Oct. 2017, the contents of which are herein incorporated by reference in its entirety.

BACKGROUND

Generally, with the increasing amounts of information being stored, it may be beneficial to efficiently store and manage that information. While there may be numerous techniques for storing and managing information, each technique may have tradeoffs between reliability and efficiency.

BRIEF SUMMARY OF DISCLOSURE

In one example implementation, a method, performed by one or more computing devices, may include but is not limited to receiving, by a computing device, an I/O request, wherein the I/O request may include host I/O priority information. It may be determined that the I/O request is associated with a token bucket of a plurality of token buckets based upon, at least in part, the host I/O priority information. If the token bucket of the plurality of token buckets has sufficient tokens for the I/O request, the I/O request may be sent down a block stack for processing, and if the token bucket of the plurality of token buckets has insufficient tokens for the I/O request, the I/O request may be rejected.

One or more of the following example features may be included. The priority information may be sent from host side. The priority information may be encapsulated into a common protocol driver structure. A token may be added to each token bucket of the plurality of token buckets at a different rate, wherein the different rate may be based upon, at least in part, a respective priority level assigned to the plurality of token buckets. Sending the I/O request down the block stack for processing may include placing the I/O into a priority queue of a plurality of priority queues, wherein the priority queue may be weighted based upon the host I/O priority information of the I/O request. The plurality of priority queues may be in a multi-core cache portion of the block stack. The I/O request may be sent for placement into a second priority queue of a second plurality of priority queues in a multi-core RAID portion of the block stack, wherein the second priority queue may be weighted based upon the host I/O priority information of the I/O request.

In another example implementation, a computing system may include one or more processors and one or more memories configured to perform operations that may include but are not limited to receiving an I/O request, wherein the I/O request may include host I/O priority information. It may be determined that the I/O request is associated with a token bucket of a plurality of token buckets based upon, at least in part, the host I/O priority information. If the token bucket of the plurality of token buckets has sufficient tokens for the I/O request, the I/O request may be sent down a block stack for processing, and if the token bucket of the plurality of token buckets has insufficient tokens for the I/O request, the I/O request may be rejected.

One or more of the following example features may be included. The priority information may be sent from host side. The priority information may be encapsulated into a common protocol driver structure. A token may be added to each token bucket of the plurality of token buckets at a different rate, wherein the different rate may be based upon, at least in part, a respective priority level assigned to the plurality of token buckets. Sending the I/O request down the block stack for processing may include placing the I/O into a priority queue of a plurality of priority queues, wherein the priority queue may be weighted based upon the host I/O priority information of the I/O request. The plurality of priority queues may be in a multi-core cache portion of the block stack. The I/O request may be sent for placement into a second priority queue of a second plurality of priority queues in a multi-core RAID portion of the block stack, wherein the second priority queue may be weighted based upon the host I/O priority information of the I/O request.

In another example implementation, a computer program product may reside on a computer readable storage medium having a plurality of instructions stored thereon which, when executed across one or more processors, may cause at least a portion of the one or more processors to perform operations that may include but are not limited to receiving an I/O request, wherein the I/O request may include host I/O priority information. It may be determined that the I/O request is associated with a token bucket of a plurality of token buckets based upon, at least in part, the host I/O priority information. If the token bucket of the plurality of token buckets has sufficient tokens for the I/O request, the I/O request may be sent down a block stack for processing, and if the token bucket of the plurality of token buckets has insufficient tokens for the I/O request, the I/O request may be rejected.

One or more of the following example features may be included. The priority information may be sent from host side. The priority information may be encapsulated into a common protocol driver structure. A token may be added to each token bucket of the plurality of token buckets at a different rate, wherein the different rate may be based upon, at least in part, a respective priority level assigned to the plurality of token buckets. Sending the I/O request down the block stack for processing may include placing the I/O into a priority queue of a plurality of priority queues, wherein the priority queue may be weighted based upon the host I/O priority information of the I/O request. The plurality of priority queues may be in a multi-core cache portion of the block stack. The I/O request may be sent for placement into a second priority queue of a second plurality of priority queues in a multi-core RAID portion of the block stack, wherein the second priority queue may be weighted based upon the host I/O priority information of the I/O request.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
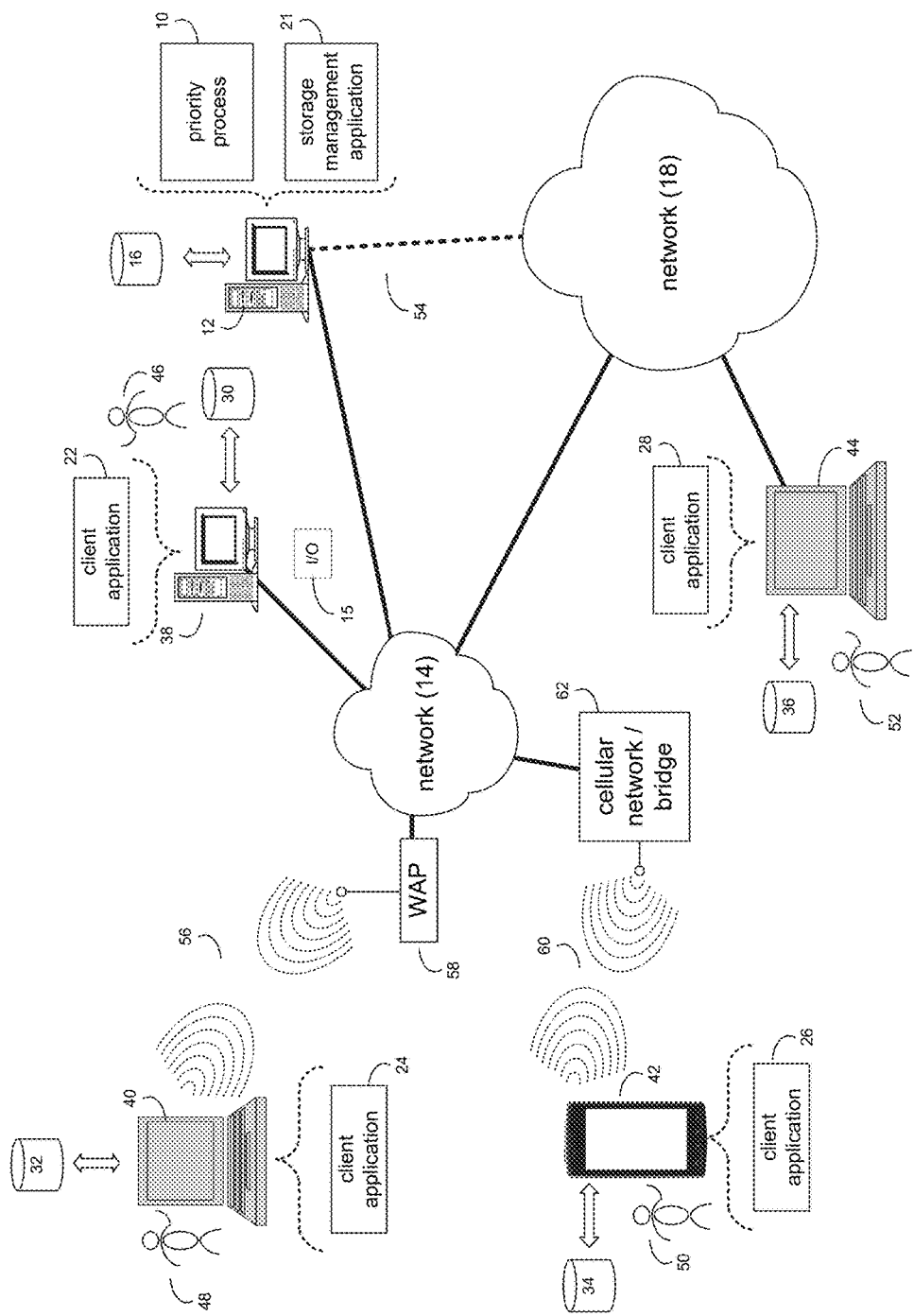
FIG. 1 is an example diagrammatic view of a priority process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown priority process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a priority process, such as priority process 10 of FIG. 1, may receive, by a computing device, an I/O request (e.g., I/O 15), wherein the I/O request may include host I/O priority information. It may be determined that the I/O request is associated with a token bucket of a plurality of token buckets based upon, at least in part, the host I/O priority information. If the token bucket of the plurality of token buckets has sufficient tokens for the I/O request, the I/O request may be sent down a block stack for processing, and if the token bucket of the plurality of token buckets has insufficient tokens for the I/O request, the I/O request may be rejected.

In some implementations, the instruction sets and subroutines of priority process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, priority process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network. An example cloud computing environment that may be used with the disclosure may include but is not limited to, e.g., Elastic Cloud Storage (ECS™) from Dell EMC™ of Hopkinton, Mass. In some implementations, other cloud computing environments may be used without departing from the scope of the disclosure.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, priority process 10 and/or storage management application 21 may be accessed via one or more of client applications 22, 24, 26, 28. In some implementations, priority process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within priority process 10, a component of priority process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of priority process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of priority process 10 (and vice versa). Accordingly, in some implementations, priority process 10 may be a purely server-side application, a purely client-side application, or a hybrid server-side/client-side application that is cooperatively executed by one or more of client applications 22, 24, 26, 28 and/or priority process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, priority process 10, and storage management application 21, taken singly or in any combination, may effectuate some or all of the same functionality, any description of effectuating such functionality via one or more of client applications 22, 24, 26, 28, priority process 10, storage management application 21, or combination thereof, and any described interaction(s) between one or more of client applications 22, 24, 26, 28, priority process 10, storage management application 21, or combination thereof to effectuate such functionality, should be taken as an example only and not to limit the scope of the disclosure.

In some implementations, one or more of users 46, 48, 50, 52 may access computer 12 and priority process 10 (e.g., using one or more of client electronic devices 38, 40, 42, 44) directly through network 14 or through secondary network 18. Further, computer 12 may be connected to network 14 through secondary network 18, as illustrated with phantom link line 54. Priority process 10 may include one or more user interfaces, such as browsers and textual or graphical user interfaces, through which users 46, 48, 50, 52 may access priority process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
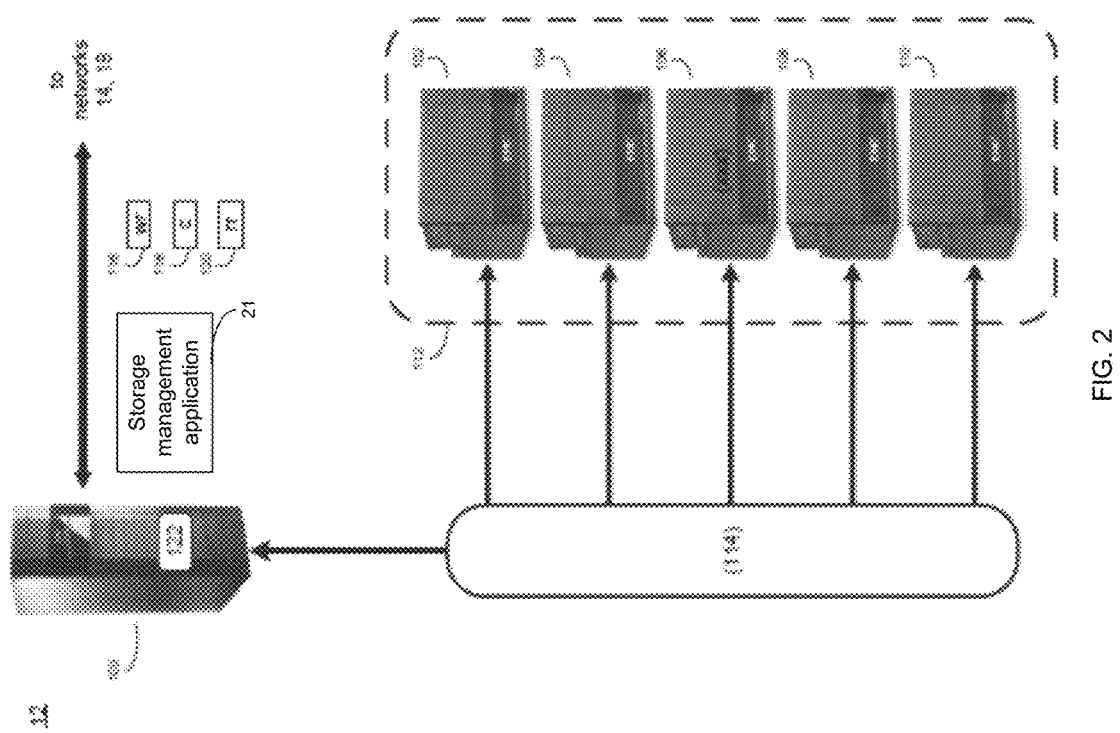
FIG. 2 is an example diagrammatic view of a computer of FIG. 1 according to one or more example implementations of the disclosure.
Figure 3:
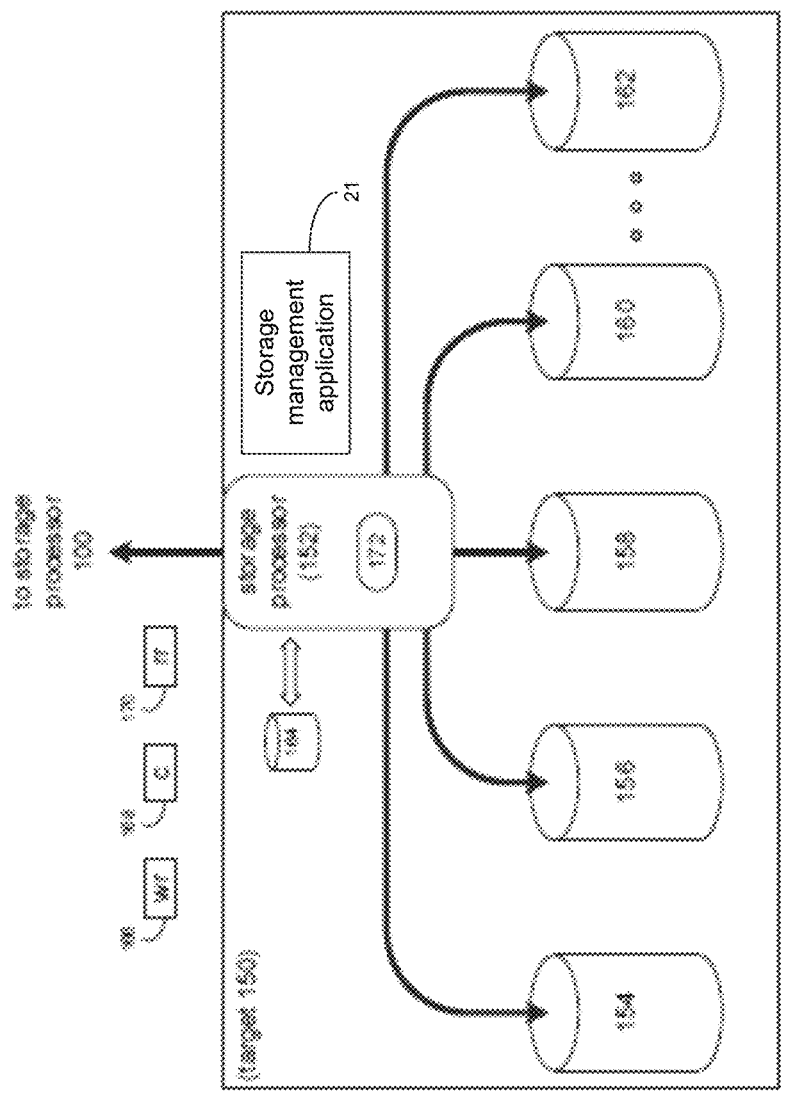
FIG. 3 is an example diagrammatic view of a storage target of FIG. 1 according to one or more example implementations of the disclosure.
Figure 4:
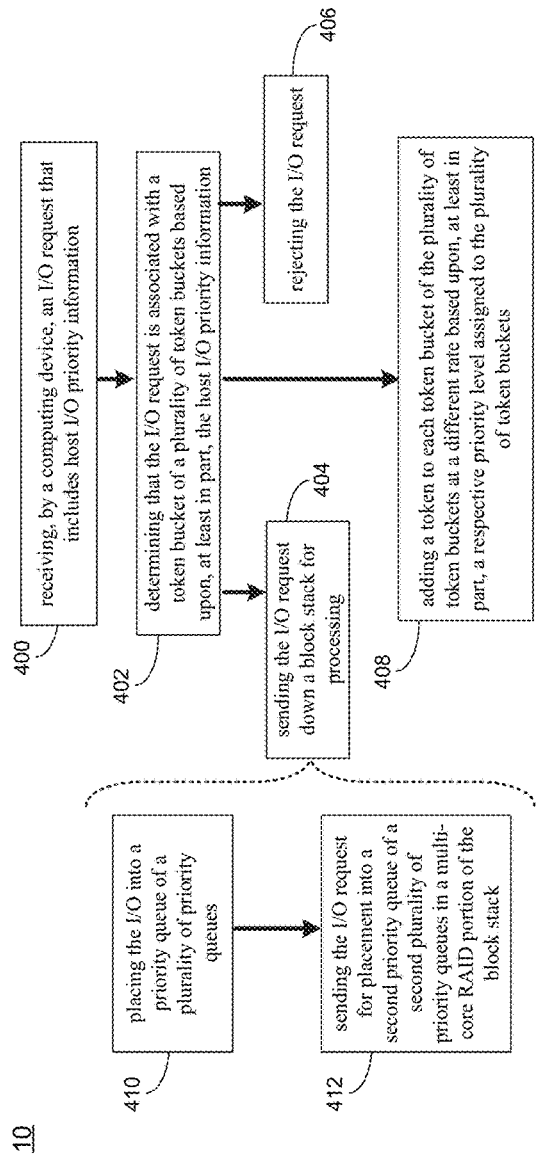
FIG. 4 is an example flowchart of a priority process according to one or more example implementations of the disclosure.

Data Storage System:

Referring also to the example implementation of FIGS. 2-3 (e.g., where computer 12 may be configured as a data storage system, such as but not limited to the VNX storage system from Dell EMC™), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management application 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management application 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management application 21). Additionally/alternatively (e.g., when storage processor 100 is configured as an application server or otherwise), content 118 to be written to computer 12 may be internally generated by storage processor 100 (e.g., via storage management application 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or priority process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management application 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management application 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management application 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management application 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management application 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management application 21) and initially stored (e.g., via storage management application 21) within front end cache memory system 172.

Generally, Quality of Service (QoS) may be the description or measurement of the overall performance of service, especially performance seen by users. For enterprise storage, on the other hand, QoS is the idea that system I/O per second (TOPS), throughput, I/O response time, and other characteristics can be measured, improved and guaranteed in advance.

For some storage systems, QoS may be used to provide control of workloads to efficiently manage their impact on other storage systems. For instance, some storage systems may limit the amount of Host block I/Os that may be serviced by a storage array. As a couple non-limiting examples, the service provider may want to set a maximum service level according to what subscription the customer has, or a storage administrator may want to control amount of I/O requests from non-essential workloads are processed so they will not tie-up valuable storage resources and affect critical workloads. Generally, I/O limits may be defined using, e.g., IOPS, KiloBytes Per Second (KBPS), IOPS and KBPS (whichever is reached first).

Generally, an I/O limit may be applied (e.g., via storage management application 21) to an individual LUN or to a group of LUNs. When applying to a group of LUNs, and when the limit is not shared, the same limit may be applied to each LUN in the group. When the limit is shared, the combined activity from all LUNs in the group may be limited. Once the defined limit is reached, I/Os may be delayed (e.g., queued). If the host server has set its outstanding I/O, this may slow down its I/O processing. The control may be implemented (e.g., via storage management application 21) as a driver under block protocol stack (Hostside).

I/O requests without limits may be processed as usual. I/O requests with limit may be sorted by storage management application 21 into its corresponding control object (e.g., bucket) verified against its corresponding limit before further processing.

Some QoS layers may only consider the policy that limits IOPS based on capacity (e.g., LUN space) associated with the user defined policy, where the main purpose of the policy may be limiting the burst (e.g., rate and time) for LUNs. Typically, I/O-based quality is not targeted.

Typically, a multi-core cache MCC (e.g., DRAM Cache) and a multi-core RAID MCR may be terminated by a module (e.g., MCx). The MCx module may be the terminator of the I/O, and the MCx module may include the MCC and the MCR. Generally, for the MCC, the MCx software component (via storage management application 21) may optimize a Storage Processor's DRAM to increase host write and read performance. Designed to effectively scale across multiple CPU cores, MCC may tie all other MCx components together and provides write caching for all the associated software layers.

Generally, for the MCR, the MCx component may define, manage, create, and maintain RAID protection for any created storage pools, and may be designed to effectively scale across multiple CPU cores, where MCR operations need not be isolated to a single core.

With some storage systems, priority tagged I/Os may be serviced by the MCC and the MCR. Generally, only write I/Os from the storage front end are classified to two levels: low priority and high priority according the backend state, and all read I/Os are serviced as high priority. I/O requests (IRPs) may be tagged with a priority flag within the MCC and may be transmitted to the MCR, where the MCR may service the I/O requests according the priority tag to implement differentiated service quality.

Generally, known storage systems may not support an end-to-end priority classification mechanism (e.g., QoS modules and MCx tagged I/O mechanisms generally could not implement application level sensitive service quality guarantees). For instance, known QoS modules may only support I/O limitations associated with the LUN-based token bucket algorithm, where the main purpose of the module may be "traffic shaping", thus limit bursts for LUNs, throughput, and time response guarantees are not to be considered carefully. If those are the only guarantees, it may not be possible to satisfy time-critical application level granularity.

MCx tagged I/O mechanisms may simply support some special conditions and may only be available for write I/Os. In additional, the I/O priority is typically judged inside the MCx from backend conditions, that may not reflect real front host priority requirements, even though QoS may be achieved to a certain extent, because the throttling algorithm may be implemented inside the MCx. Thus, known QoS is generally LUN based, which may not typically realize I/O based granularity. More particularly, current QoS solutions are generally implemented separately inside the layered driver by measured internal parameters, which may result in an inability to get the QoS requirements from the application client directly, thus, the QoS is only indirect.

As will be discussed in greater detail below, priority process 10 may implement a new end-to-end QoS solution through a layered data path software stack. As a result, at least, for example, by using a SCSI protocol stack with priority information to ensure I/O based granularity of service quality, and by providing a multiple priority classification algorithm to enable time-sensitive and mission-critical applications to have the resources they require while allowing other applications to obtain responses, priority process 10 may have the advantage to implement better QoS to guarantee throughput for mission-critical applications so that their transactions may be processed in an acceptable amount of time, thereby improving the overall user experience.

As will be discussed below, priority process 10 may at least help, e.g., the improvement of an existing storage technology, necessarily rooted in computer technology in order to overcome an example and non-limiting problem specifically arising in the realm of data storage. For instance, priority process 10 may use an efficient process to improve QoS.

The Priority Process:

As discussed above and referring also at least to the example implementations of FIGS. 4-9, priority process 10 may receive 400, by a computing device, an I/O request, wherein the I/O request may include host I/O priority information. Priority process 10 may determine 402 that the I/O request is associated with a token bucket of a plurality of token buckets based upon, at least in part, the host I/O priority information. If the token bucket of the plurality of token buckets has sufficient tokens for the I/O request, priority process 10 may send 404 the I/O request down a block stack for processing, and if the token bucket of the plurality of token buckets has insufficient tokens for the I/O request, priority process 10 may reject 406 the I/O request.

While the present disclosure may be described using a VNX based storage system, it will be appreciated that other types of storage systems may be used without departing from the scope of the disclosure. As such, the particular storage system described should be taken as example only and not to otherwise limit the scope of the disclosure.

Figure 5:
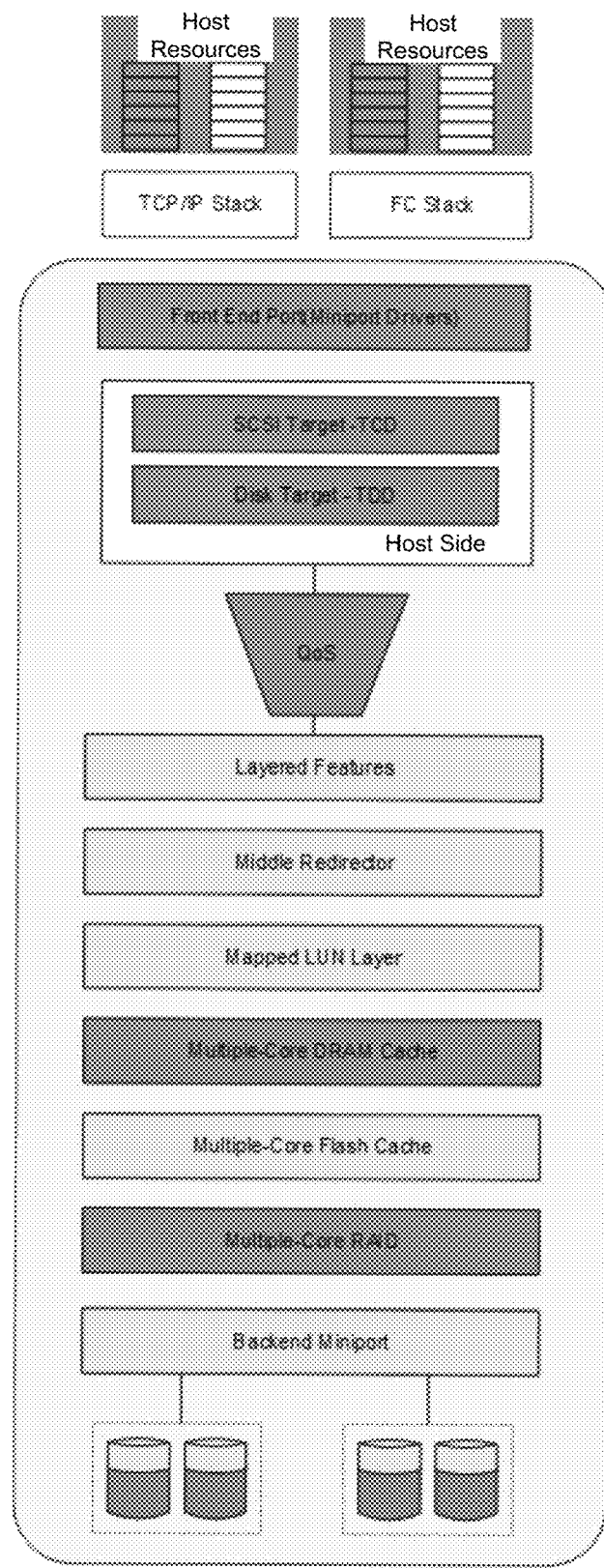
FIG. 5 is an example diagrammatic view of an example of layered software modules according to one or more example implementations of the disclosure.
Figure 6:
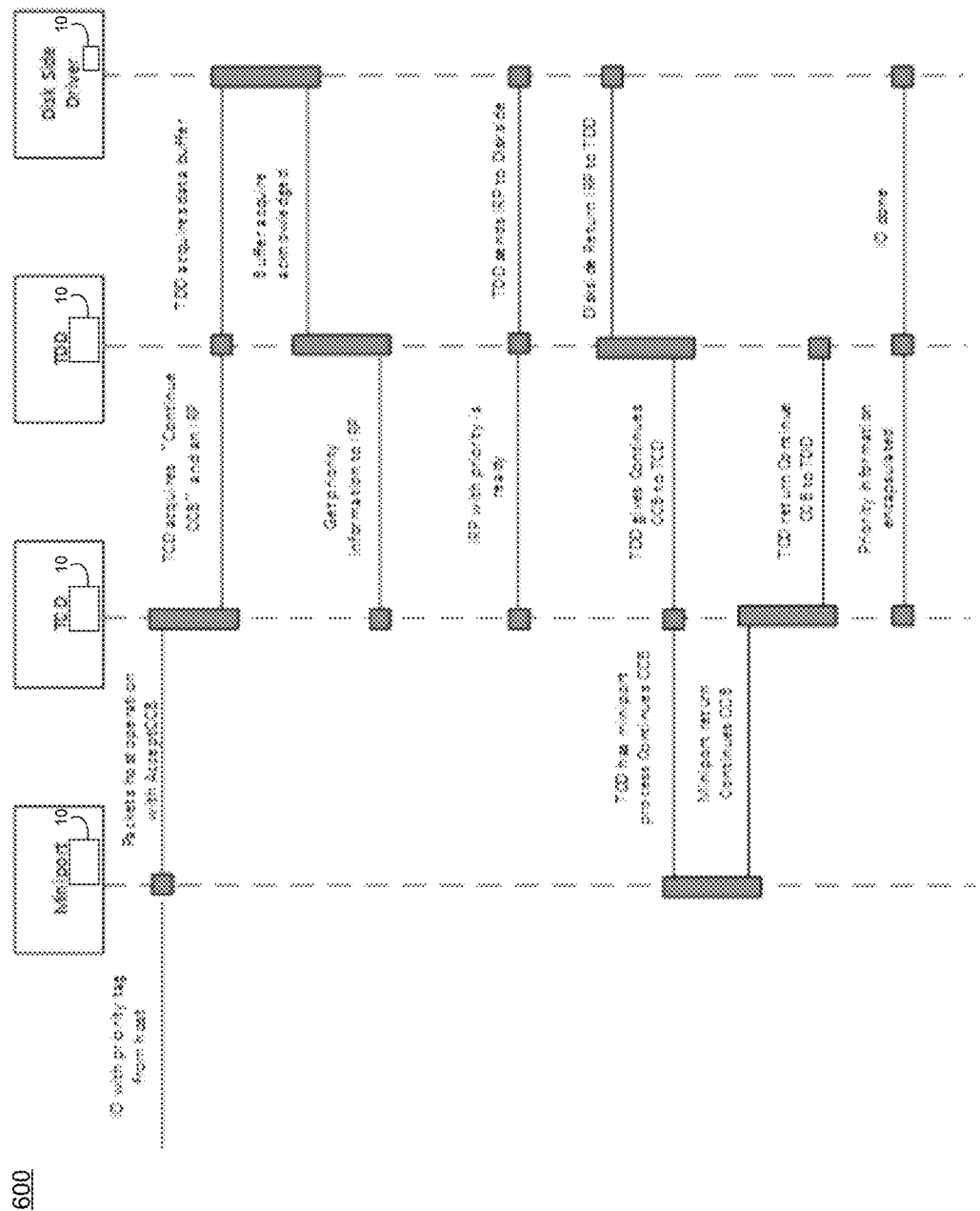
FIG. 6 is an example diagrammatic view of Host Side priorities according to one or more example implementations of the disclosure.
Figure 7:
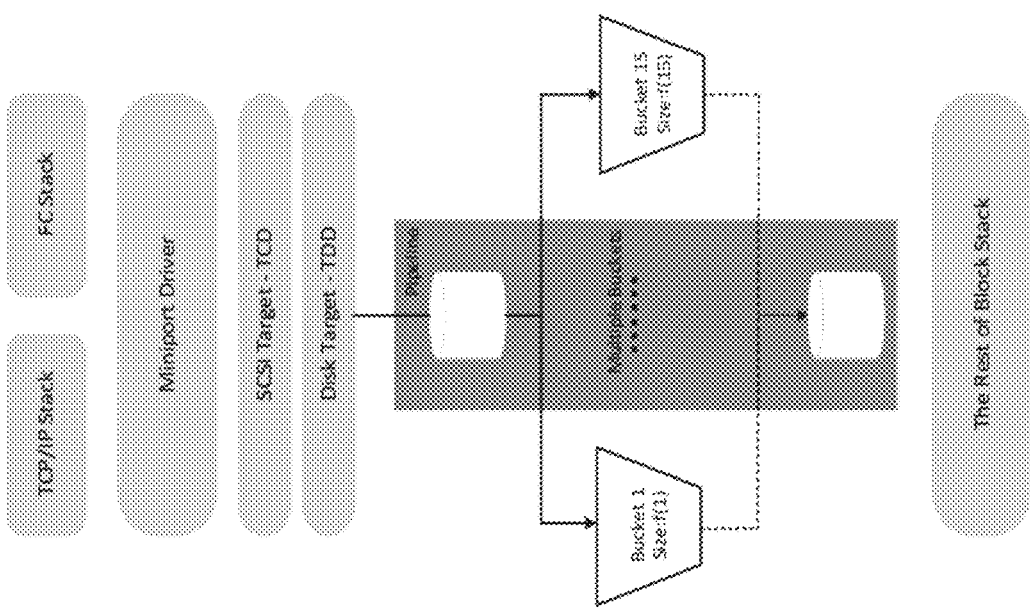
FIG. 7 is an example diagrammatic view of an example multiple token buckets block diagram according to one or more example implementations of the disclosure.
Figure 8:
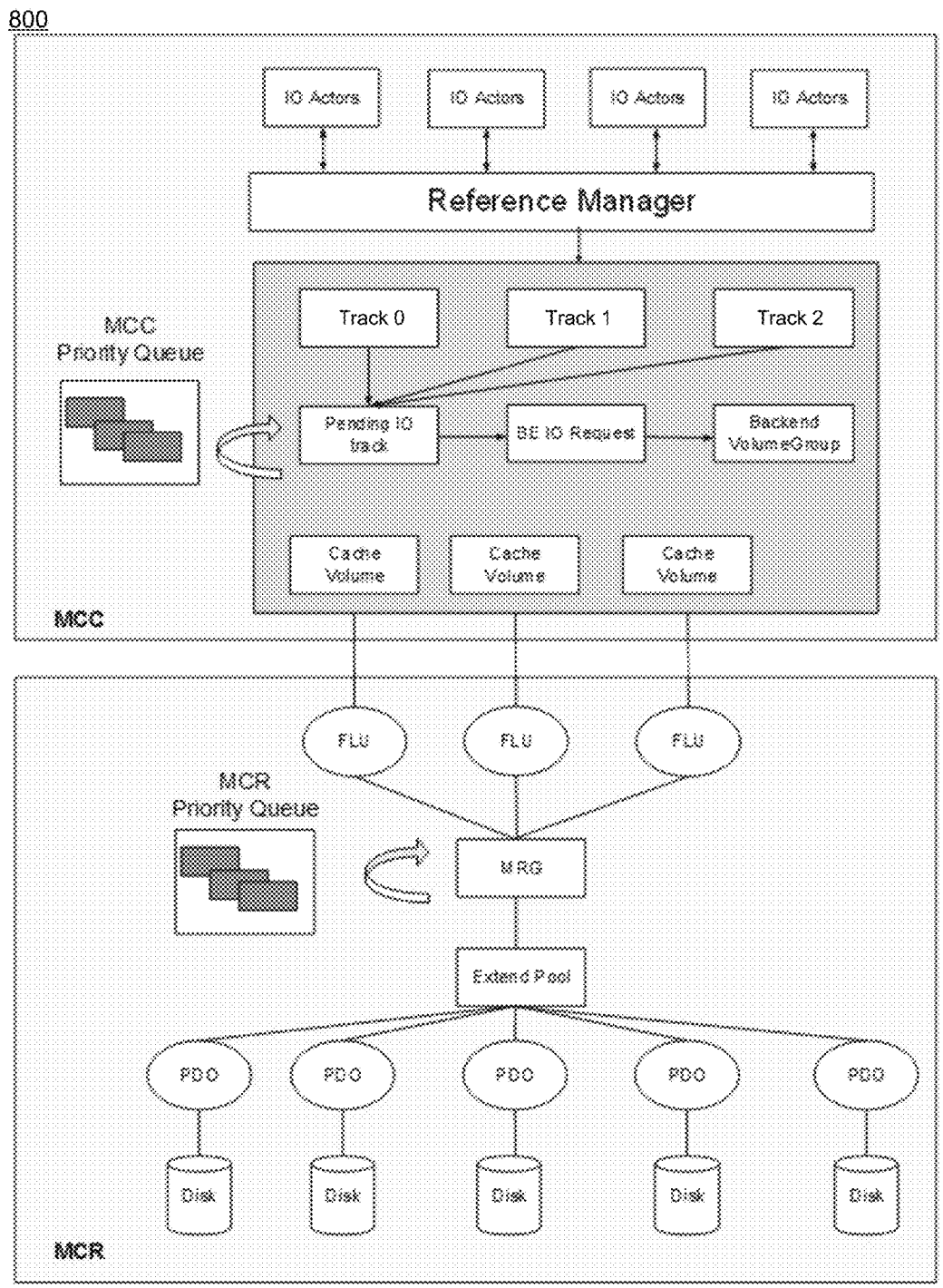
FIG. 8 is an example diagrammatic view of MCx handling for priority tagged I/O according to one or more example implementations of the disclosure.
Figure 9:
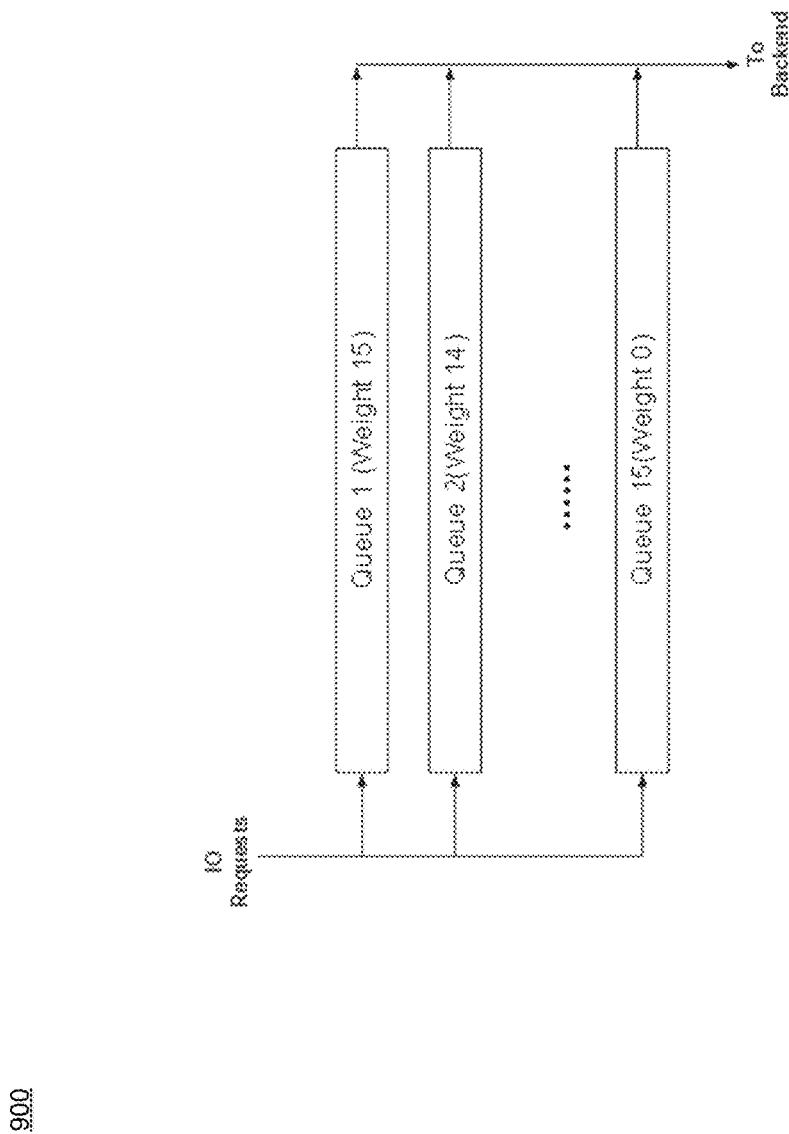
FIG. 9 is an example diagrammatic view of an example MCC handling for priority tagged I/O according to one or more example implementations of the disclosure.

In some implementations, and referring at least to the example implementation of FIG. 5, an example of layered software modules 500 is shown. In the example, an "End-to-End" QoS implementation may involve, e.g., a host (e.g., application client), a miniport, a host side (TCD and TDD), a multiple-priority QoS module, and MCx components. As will be described below, the host side, miniport, host side, QoS, MCC and MCR may be the main (but not only) players involved in the improved QoS solution.

In some implementations, priority process 10 may receive 400, by a computing device, an I/O request, wherein the I/O request may include host I/O priority information. For instance, assume for example purposes only that a client sends an I/O request to access data. In the example, priority process 10 may receive 400 that I/O request, which may include host I/O priority information. For example, priority process 10 may change a communication standard protocol (e.g., SAM-3) to accommodate an extension to a task attribute field to allow different priorities. For instance, assume for example purposes only that an application client requests the processing of, e.g., a SCSI command by invoking, e.g., the SCSI transport protocol services, the collective operation of which may be conceptually modeled in the following procedure call:

Service Response=Execute Command (IN (I_T_L_Q Nexus, CDB, Task Attribute, [Data-In Buffer Size], [Data-Out Buffer], [Data-Out Buffer Size], [Command Reference Number], [Priority]), OUT ([Data-In Buffer], [Sense Data], [Sense Data Length], Status))

In some implementations, the priority tag may be the additional flag assigned to the task. Priority process 10 may set a priority value other than zero that specifies the relative scheduling importance of the task. For example, priority 0x1h may be the highest priority, with increasing priority values indicating lower scheduling importance (or vice versa). The size of the priority field may be, e.g., four bits, and the priority may contain, e.g., 15 levels from 0x1h to 0xFh. It will be appreciated that more or less priority levels may be used.

In some implementations, if the priority is set to zero, or is not contained within the SCSI transport protocol service indication, a priority code may be assigned to the I_T_L nexus that may be used by a task manager (via priority process 10) to determine an ordering to process tasks in addition to its vendor specific ordering rules.

In some implementations, the priority tag in the SCSI transport protocol service may be introduced as the application client originated IO-based QoS base. The application client may have awareness of the mission-critical I/Os, which may tag the I/O with different priorities according to the urgency of the task, and the eventual application may achieve I/O level granularity of priority. To realize the function, the application client initiator driver may support the Per-Command priority tagging standard (or similar standard).

In some implementations, regarding the Host Side handling for tagged SCSI commands, separate drivers (via priority process 10) may implement each logically distinct layer of the I/O processing (as shown in FIG. 5). For example, drivers in the lowest layer may manipulate the physical devices (e.g., the RAID group or backend driver). Other drivers may then be layered on top of the device drivers. These higher-level drivers may not know any details about the physical devices. With the I/O manager's help, they (via priority process 10) may simply pass logical I/O requests down to the device drivers, which access the physical devices may be accomplished on their behalf. For passing the priority information to lower layers, priority process 10 may use the I/O requests to handle it. The Host Side (via priority process 10) may handle the tagged SCSI command to I/O requests with priority information. The Host may include a remote client, which may initiate the write/read I/O to the storage system through Ethernet for FC, for example. Host Side (via priority process 10) may be one of the layered software modules, which may directly receive/process the I/O request from Host and extract the information from CDB, where it may be encapsulated into IRP format (discussed more below).

In some implementations, the Host Side (via priority process 10) may be one of the components capable of being used to communicate with the frontend (e.g., dual mode iSCSI and FC) drivers. Dual mode may generally refer to the fact that these drivers may (via priority process 10) initiate the I/O and service the target I/O to the logical units (LUs). The Host Side component (via priority process 10) may handle the SCSI semantics and may pass read buffer/write buffer SCSI requests down the I/O stack as IOCTLs.

For the frontend, the storage system may present a set of ports to allow host access to the storage features of the array. These ports may fall into two broad classes (e.g., Ethernet and Fiber Channel). Ethernet ports may be used for both file and block services, while the Fiber Channel ports may be used just for block services. Frontend ports may be provided by SLICs that are inserted into the back of the storage processor. Device drivers for these ports may be provided in two places, such as, e.g., the LINUX kernel for network devices (also using the LINUX TCP/IP stack) and in the user space Data Path Container.

Block services may depend partially on the same set of LINUX device drivers and TCP/IP stack, but may use a different method to move the data from the LINUX kernel into the Data Path Container (DPC) for processing. This may be primarily for iSCSI services. Fiber Channel services may represent the other part of the block services world. The user space container, e.g., SAFE, may have the Fiber Channel device driver running inside it, using a helper, e.g., CSX Helper, container in the kernel to bridge the divide between kernel and user space. Requests from both the iSCSI and Fiber Channel driver may enter the TCD/TDD layers (called Host Side) for SCSI command processing. Host Side (via priority process 10) may convert the incoming CDB requests into different operations down the data path stack.

In some implementations, the Host Side may have two drivers (e.g., TCD and TDD). TCD (via priority process 10) may provide the function of control/configure the interface to create/change/delete. Another function may be to receive the SCSI command from the miniport driver and direct the Host SCSI commands to the LUN/volume, where the commands may be addressed to LUs that exist may be sent to the TDD driver. The TDD (via priority process 10) may be responsible for providing the correct semantics for SCSI commands that are addressed to disk. It may translate SCSI to IRP (I/O request packet) for the internal commands which may be sent to the lower layer data stacks.

In some implementations, the priority information may be sent from host side. For example, the priority information may be sent from the host with a SCSI command, which is different from the SET PRIORITY in the above-noted SPC3, as the priority may be per-command priority tagging with "Execute Command" procedure in the SCSI transport protocol. As noted above, the command priority may be a value in the range of 0x1h through 0xFh.

Regarding the I/O request interface, the miniport driver (via priority process 10) may receive the SCSI command procedure and set its Common Protocol Driver (CPD) interface. The CPD interface may primarily consist of a set of basic I/O requests, and secondarily may consist of TCD routines that the miniports (via priority process 10) may call directly, and miniport routines that TCD may call directly. In some implementations, priority process 10 may encapsulate the priority information into a common protocol driver structure. For example:

```
#pragma pack(4)
typedef struct CPD_COMMAND_PRIORITY_TAG
{
    CPD_IOCTL_HEADER   ioctl_hdr;
    CPD_ PRIORITIES        param;
} S_ COMMAND_PRIORITY, * PS_ COMMAND_PRIORITY;
#pragma pack( )
```

After the priority information is retrieved by the TCD driver, each SCSI CDB may be copied (via priority process 10) into the Host Side internal structure (e.g., AcceptCCB) with the priority information. An AcceptCCB may be associated with each arriving SCSI CDB. The AcceptCCB may remain in existence until after the status has been sent to the host, until the request is cleaned up. For example:

```
struct _ACCEPT_CCB {
PVOID TcdIrp;                      //IRP related with CCB
CPD_COMMAND_PRIORITY_TAG CCB_Priority;
//CCB priority relate with per-
SCSI command
UCHAR Cdb[16];                  // The SCSI command.
... .....
```

```
}S_ACCEPT_CCB;
ScsiTargAcceptCallback(PACCEPT_CCB Ccb)
{
 ... ...;
 Ccb-> CCB_Priority = ScsiTargValidatePriority((&Ccb->Path.lun));
 ... ...;
}
```

The "ScsiTargAcceptCallback( )" at the ISR may be called directly by the miniport driver (via priority process 10) to submit an Accept CCB to this driver. This function may execute at an interrupt handler (e.g., DIRQLn). This function may save the CCB on a circular list. That circular list may be processed by a Deferred Procedure Call (DPC).

After that, the IRP may need to be allocated from the pre-allocated pool. With the IRP, the layered software stack may exchange the data and request between layered drivers. Thus, the IRP may be the preferred way to transfer the priority information, rather than over the IOCTRL interface.

The Disk Side may represent the layers of the stack under the Host Side. For each IRP, priority process 10 may define the "EMCPAL_IRP_STACK_FLAGS" macro and with "SetFlags( )" and "GetFlags" in "CacheIrpFlags" class wraps an IRP flags data type. As noted above an example number of 15 priorities may be defined for the IRP flags. The IRP flag may be set by the TDD (via priority process 10) with regard to the CCB_Priority in AcceptCCB. For example:

```
#define SL_K10_PER_SCSI_PRIORITY_00H
#define SL_K10_PER_SCSI_PRIORITY_01H
#define SL_K10_PER_SCSI_PRIORITY_02H
 . . .
#define SL_K10_PER_SCSI_PRIORITY_0FH
```

Then the Host Side call "IoCallDriver( )" may send an I/O IRP down to the lower disk side driver. An example of this data flow procedure 600 for the Host Side priorities procedure is shown in the example implementation of FIG. 6.

In some implementations, priority process 10 may determine 402 that the I/O request is associated with a token bucket of a plurality of token buckets based upon, at least in part, the host I/O priority information. It will be appreciate that the term "bucket" may apply to any type of control object, and therefore, such a term need not be limited to any particular type of control object. In some implementations, the token bucket may be an algorithm used by priority process 10 in a packet switched computer network and telecommunications network. It may be used to check that data transmissions, in the form of packets, conform to defined limits on bandwidth and burst (e.g., a measure of the unevenness or variations in the traffic flow). It may also be used as a scheduling algorithm to determine the timing of transmissions that will comply with the limits set for the bandwidth and burst.

A token bucket may be used in network traffic control for traffic shaping; where throughput may be controlled by tokens assigned to bucket. Each token may represent some amount of I/O, and tokens may be assigned to buckets at a fixed rate, for example, 1K IOPS limit means 1K tokens are assigned (e.g., via priority process 10) to bucket each second. When the I/O is passed, the tokens are reduced, and if tokens runs out, the I/O may be rejected (e.g., via priority process 10) and the host may be notified (e.g., via priority process 10).

Generally, the token bucket algorithm may be an effective traffic shaping tool, but may only be effective with burst avoidance or noisy neighbor degrade critical client performance guarantee. In other words, Host I/O priority generally may not be considered by this method. However, by having priority process 10 implement a multiple token buckets approach, this may be overcome.

In some implementations, if the token bucket of the plurality of token buckets has sufficient tokens for the I/O request, priority process 10 may send 404 the I/O request down a block stack for processing, and if the token bucket of the plurality of token buckets has insufficient tokens for the I/O request, priority process 10 may reject 406 the I/O request. For instance, the token bucket algorithm may be conceptually understood using the following non-limiting example:

A token may be added to the bucket every 1/r seconds. The bucket may hold at the most b tokens. If a token arrives when the bucket is full, it may be discarded. When n I/O requests arrive, n tokens may be removed from the bucket, and the I/O requests may be sent 404 for processing. If fewer than n tokens are available, no tokens are generally removed from the bucket, and the I/O may be rejected 406.

In some implementations, priority process 10 may add 408 a token to each token bucket of the plurality of token buckets at a different rate, wherein the different rate may be based upon, at least in part, a respective priority level assigned to the plurality of token buckets. For instance, multiple token buckets may involve priority, where priority p may be retrieved from the IRPs, and the range of P may be 0x1 to 0xf. Given the variations, a changing factor may make the tokens increasing speed for, e.g., 15 levels. The number of token added every 1/r second for (p+1), each priorities level may have its own bucket with different token increasing speeds. Thus, for example, 15 buckets may be defined for 15 different levels of I/O priorities. Token bucket size for each priority may be define with f(p).

In some implementations, priority process 10 may create the tokens, consume the tokens, and determine if the I/O should pass for further processing. Example parameters that may be involved may include, e.g., token add speed (which is CIR (Committed information)/EIR (Excess information rate)) and the token bucket size CBS (Committed burst size)/EBS (Excess Burst Size). Multiple token bucket algorithms may be adjusted with these two parameters for multiple token buckets for multiple level priorities. An example multiple token buckets block diagram 700 is shown in the example implementation of FIG. 7.

In some implementations, the array software stack may be a layered architecture, and for any I/O request, it may be processed (e.g., via priority process 10) according to the layer. For instance, the MCC and MCR may be the terminator of the layered I/O stack. When an I/O request is received from the host, the Host Side driver may realize the access to the storage LUN functionality and SCSI semantics for the initiators. The I/O request may be passed to the mapper layer unit (MLU), which may be a layered driver that may provide thin provisioning and storage pools, which may then be sent to the cache (e.g., DRAM Cache). For write requests, the I/O may be synced to a peer array controller and then I/O write completion may be acknowledged. A background thread (e.g., via priority process 10) may flush the dirty cache pages to backend storage, e.g., RAID group. After data is written to backend storage devices (e.g., disks), a write I/O is completed successfully. For read requests, the I/O may run as a sync mode, where the backend read request may be initiated to the MCR and after the read content may be returned to the MLU, where the I/O request may be acknowledged. In essence, an aspect of the MCx processing may be to make the Raid group based or LUN based granularity into IO based granularity. With multiple queues, that queues classification may be decided by the I/O priority level numbers. Each I/O with its priority may be placed in its specific queue.

Some storage systems may have the MCC only classify front I/Os with two priorities, e.g., high and low. Normal I/Os may be low priority, and if there is a critical condition, such as the backend being slow or a single loop failure, or RAID rebuilding, or any circumstances that may cause data loss, needs that data to be persisted immediately, and thus may be high priority. The MCR (e.g., via priority process 10) may process the I/O and schedule the high priority I/O with more credit to flush in to disks.

In some implementations, sending 404 the I/O request down the block stack for processing may include placing 410 the I/O into a priority queue of a plurality of priority queues, wherein the priority queue may be weighted based upon the host I/O priority information of the I/O request. In some implementations, the plurality of priority queues may be in a multi-core cache portion of the block stack. For instance, and referring at least to the example implementation of FIG. 8, an example block diagram 800 of the MCx handling for priority tagged I/O is shown. In the example, priority process 10 may enhance the MCC with multiple priority queues in a pending I/O queue. A pending I/O queue may be a queue where the I/O waits before it is sent to the backend, where the I/O may need to be pending into the queue waiting for backend credit. Credit may represent the queue depth of backend that I may support. The MCC generally must get credit for each I/O before it is sent to the MCR to avoid I/O congestion. However, unlike a basic high/low priority queue, priority process 10 may involve multiple level priority queues, which may be set by different weights. The corresponding I/O request with its priority information may be placed into its appropriate queue, where the queue weight determines the speed of the I/O being sent to the backend. In the example, the higher priority I/Os may be scheduled faster than lower priority I/Os.

In some implementations, priority process 10 may send 412 the I/O request for placement into a second priority queue of a second plurality of priority queues in a multi-core RAID portion of the block stack, wherein the second priority queue may be weighted based upon the host I/O priority information of the I/O request. For instance, and referring at least to the example implementation of FIG. 9, an example MCC handling for priority tagged I/O is shown. In the example, the MCR e.g., via priority process 10) may handle the incoming I/O request with a different strategy. For the MCR, the RAID group (shown via FIG. 8) may use background credit (different than I/O credit) as the mechanism to balance the internal I/Os. However, user I/O priority may be measured by the above-noted I/O priority information. For instance, the MCR priority queues may be introduced inside the RAID group module with, e.g., 15 levels. The pending I/Os may gets rescheduled cycle by cycle. In each reschedule cycle, RAID may be rescheduled, e.g., 15 times background credit for high priority I/Os than level 1 lower priority I/Os. The I/O with the same priority in its respective priority level queue may be rescheduled in a First in First out (FIFO) manner.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
  receiving, by a computing device, an I/O request, wherein the I/O request includes host I/O priority information;
  determining that the I/O request is associated with a token bucket of a plurality of token buckets based upon, at least in part, the host I/O priority information; and
  if the token bucket of the plurality of token buckets has sufficient tokens for the I/O request:
    sending the I/O request down a block stack for processing, wherein sending the I/O request down the block stack for processing includes placing the I/O into a priority queue of a plurality of priority queues in a multi-core cache portion of the block stack, wherein the priority queue is weighted based upon the host I/O priority information of the I/O request, and
    sending the I/O request for placement into a second priority queue of a second plurality of priority queues in a multi-core RAID portion of the block stack, wherein the second priority queue is weighted based upon the host I/O priority information of the I/O request; and
  if the token bucket of the plurality of token buckets has insufficient tokens for the I/O request, rejecting the I/O request.

2. The computer-implemented method of claim 1 wherein the priority information is sent from host side.

3. The computer-implemented method of claim 1 wherein the priority information is encapsulated into a common protocol driver structure.

4. The computer-implemented method of claim 1 further comprising adding a token to each token bucket of the plurality of token buckets at a different rate, wherein the different rate is based upon, at least in part, a respective priority level assigned to the plurality of token buckets.

5. A computer program product residing on a non-transitory computer readable storage medium having a plurality of instructions stored thereon which, when executed across one or more processors, causes at least a portion of the one or more processors to perform operations comprising:
   receiving an I/O request, wherein the I/O request includes host I/O priority information;
   determining that the I/O request is associated with a token bucket of a plurality of token buckets based upon, at least in part, the host I/O priority information; and
   if the token bucket of the plurality of token buckets has sufficient tokens for the I/O request;
      sending the I/O request down a block stack for processing, wherein sending the I/O request down the block stack for processing includes placing the I/O into a priority queue of a plurality of priority queues in a multi-core cache portion of the block stack, wherein the priority queue is weighted based upon the host I/O priority information of the I/O request, and
      sending the I/O request for placement into a second priority queue of a second plurality of priority queues in a multi-core RAID portion of the block stack, wherein the second priority queue is weighted based upon the host I/O priority information of the I/O request; and
   if the token bucket of the plurality of token buckets has insufficient tokens for the I/O request, rejecting the I/O request.

6. The computer program product of claim 5 wherein the priority information is sent from host side.

7. The computer program product of claim 5 wherein the priority information is encapsulated into a common protocol driver structure.

8. The computer program product of claim 5 wherein the operations further comprise adding a token to each token bucket of the plurality of token buckets at a different rate, wherein the different rate is based upon, at least in part, a respective priority level assigned to the plurality of token buckets.

9. A computing system including one or more processors and one or more memories configured to perform operations comprising:
   receiving an I/O request, wherein the I/O request includes host I/O priority information;
   determining that the I/O request is associated with a token bucket of a plurality of token buckets based upon, at least in part, the host I/O priority information; and
   if the token bucket of the plurality of token buckets has sufficient tokens for the I/O request;
      sending the I/O request down a block stack for processing, wherein sending the I/O request down the block stack for processing includes placing the I/O into a priority queue of a plurality of priority queues in a multi-core cache portion of the block stack, wherein the priority queue is weighted based upon the host I/O priority information of the I/O request, and
      sending the I/O request for placement into a second priority queue of a second plurality of priority queues in a multi-core RAID portion of the block stack, wherein the second priority queue is weighted based upon the host I/O priority information of the I/O request; and
   if the token bucket of the plurality of token buckets has insufficient tokens for the I/O request, rejecting the I/O request.

10. The computing system of claim 9 wherein the priority information is sent from host side.

11. The computing system of claim 9 wherein the priority information is encapsulated into a common protocol driver structure.

12. The computing system of claim 9 wherein the operations further comprise adding a token to each token bucket of the plurality of token buckets at a different rate, wherein the different rate is based upon, at least in part, a respective priority level assigned to the plurality of token buckets.

* * * * *